(12) United States Patent
Boyle (10) Patent No.: US 9,038,784 B2
(45) Date of Patent: May 26, 2015

(54) WEARING INDICATOR (71) Applicant: Akebono Brake Corporation, Farmington Hills, MI (US)

(72) Inventor: Brian Lewis Boyle, Farmington Hills, MI (US)

(73) Assignee: AKEBONO BRAKE CORPORATION, Farmington Hills, MI (US)

( * ) Notice: Subject to any disclaimer, the term of this patent is extended or adjusted under 35 U.S.C. 154(b) by 56 days.

(21) Appl. No.: 13/713,067

(22) Filed: Dec. 13, 2012

(65) Prior Publication Data

US 2014/0166410 A1 Jun. 19, 2014

(51) Int. Cl.
*F16D 66/02* (2006.01)
*B60T 17/22* (2006.01)

(52) U.S. Cl.
CPC .............. *B60T 17/22* (2013.01); *F16D 66/02* (2013.01)

(58) Field of Classification Search
CPC ....................................... F16D 66/02
USPC .................................... 188/1.11 W
See application file for complete search history.

(56) References Cited

U.S. PATENT DOCUMENTS

| | | |
|---|---|---|
| 3,297,985 A | 1/1967 | Trebonsky et al. |
| 3,611,283 A | 10/1971 | Anders et al. |
| 3,882,448 A | 5/1975 | Shibatani et al. |
| 4,037,689 A | 7/1977 | Maehara |
| 4,085,826 A * | 4/1978 | Ritsema et al. .......... 188/1.11 W |
| 4,124,105 A | 11/1978 | Maehara |
| 4,241,327 A | 12/1980 | Yamamoto |
| 4,460,067 A | 7/1984 | Katagiri et al. |
| 4,498,559 A | 2/1985 | Katagiri et al. |
| 4,742,326 A | 5/1988 | Gregoire et al. |
| 5,033,590 A * | 7/1991 | Kobayashi et al. ...... 188/1.11 W |
| 5,117,947 A * | 6/1992 | Kobayashi et al. ...... 188/1.11 W |
| 5,388,670 A | 2/1995 | Kuskye et al. |
| 5,499,696 A * | 3/1996 | Kobayashi et al. ...... 188/1.11 W |
| 6,302,241 B1 | 10/2001 | Gronowicz |
| 6,311,554 B1 | 11/2001 | Walpole |
| 2008/0251326 A1* | 10/2008 | Lundskog ............... 188/1.11 W |
| 2010/0187050 A1* | 7/2010 | Hayashi et al. .............. 188/72.3 |

* cited by examiner

*Primary Examiner* — Anna Momper
(74) *Attorney, Agent, or Firm* — The Dobrusin Law Firm, P.C.

(57) ABSTRACT

A wear indicator comprising: (a) a connector that attaches the wear indicator to a brake pad, the brake pad including a friction material having a plane; (b) a scraper; and (c) an indicator portion; wherein the indicator portion forms a cantilever connection with the scraper and extends parallel to the plane of the friction portion.

18 Claims, 7 Drawing Sheets

WEARING INDICATOR

FIELD

The present teachings generally relate to a device that connects to a brake pad and produces an audible sound during a brake apply when a friction material of the brake pad becomes thin and/or a brake pad may need to be replaced.

BACKGROUND

The present teachings are predicated upon providing an improved disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, or the like. However, the present teachings are most suitable for use with a passenger vehicle (i.e. a car, truck, sports utility vehicle, or the like).

Generally, a braking system includes a rotor, a caliper body, a support bracket, an inboard brake pad, and an outboard brake pad that are on opposing sides of the rotor. The caliper body further includes one or more fingers, a piston bore, and a bridge that connects the one or more fingers to the piston bore. The piston bore houses a piston. The piston bore has a bore axis that the piston moves along during a brake apply and a brake retract. The piston bore may include a fluid inlet, a closed wall, a front opening, and a cylindrical side wall that includes a seal groove located near the front opening. Typically, the fluid inlet is located in the closed wait of the piston bore so that when pressure is applied the fluid will flow into the piston bore. During a pressure apply the fluid will push the piston towards the front opening and into contact with a brake pad. Generally, brake pads include a pressure plate and friction material. During each pressure apply the friction material contacts a rotor, which removes a small portion of the friction material. Over repeated pressure applies the friction material slowly reduces, and due to the location of the brake pads it may be difficult for a user to cheek the thickness of the friction material, users may not check brake pad thickness, or a user may forget to check brake pad thickness. If the friction material is reduced beyond a certain point, braking performance may begin to reduce. What is needed is a wear indicator that monitors the thickness of the friction material and when the friction material thickness reaches a predetermined thickness, the wear indicator makes an audible noise so that the user is alerted to check the thickness of the friction material before braking performance is impacted.

Examples of clip on wear indicators are disclosed in U.S. Pat. Nos. 3,611,283; 4,037,089; 4,124,105; 4,241,327; 4,460,067; 4,498,559; 4,742,326; 5,388,670; 6,311,554 all of which are expressly incorporated herein by reference for all purposes. Examples of electronic wear indicators are disclosed in U.S. Pat. Nos. 3,297,985; 3,882,448; and 6,302,241 all of which are incorporated herein by reference for all purposes.

What is needed is a wear indicator that attaches to the pressure plate of a brake pad and is fastened to the pressure plate in a manner so that the wear indicator is not damaged and/or inadvertently removed during installation of one or more parts onto the brake pad and/or the brake pad being installed into the brake system. What is needed is a wear indicator that produces an audible sound so that a user is adequately alerted when a frictional material thickness reaches a predetermined thickness.

SUMMARY

One possible embodiment of the present teachings include: A wear indicator comprising: (a) a connector that attaches the wear indicator to a brake pad, the brake pad including a friction portion having a plane; (b) a scraper; and (c) an indicator portion; wherein the indicator portion forms a cantilever connection with the scraper and extends parallel to the plane of the friction portion.

One possible embodiment of the present teachings include: a wear indicator comprising: (a) a connector that attaches the wear indicator to a pressure plate of a brake member; (b) a scraper that extends from the pressure plate of the brake member over a friction material so that when a predetermined amount of the friction material is removed the scraper assists in creating an indication; and (c) an indicator portion that works in conjunction with the scraper to create the indication; wherein the indicator portion is generally planar and is free of any bends having an angle of 45 degrees or more.

Another possible embodiment of the present teachings include: a brake system comprising: (a) one or more brake members comprising; (i) a pressure plate and (ii) a friction material; (b) one or more wear indicators comprising: (i) a connector for attaching the one or more wear indicators to the pressure plate of the one or more brake members; (ii) a scraper that extends over the friction material so that when a sufficient amount of friction material is removed the scraper extends beyond the friction, material creating a sound; and (iii) an indicator portion that extends along the pressure plate.

The present teachings provide a wear indicator that attaches to the pressure plate of a brake pad and is fastened to the pressure plate in a manner so that the wear indicator is not damaged and/or inadvertently removed during installation of one or more parts onto the brake pad and/or the brake pad being installed into the brake system. The present teachings provide a wear indicator that produces an audible sound so that a user is adequately alerted when frictional material thickness reaches a predetermined thickness.

DETAILED DESCRIPTION

The explanations and illustrations presented herein are intended to acquaint others skilled in the art with the invention, its principles, and its practical application. Those skilled in the art, may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

As discussed above a disc brake system generally includes a support bracket, a caliper, a rotor, and at least two brake pads. Each brake pad typically includes at least a pressure plate and friction material. The pressure plate and the friction material lie in a plane. The plane of the pressure plate and the plate of the friction material are substantially parallel to each other. The one or more pressure plates may be of any size and shape so that the pressure plate assists in creating a brake apply. The pressure plate may have a sufficient width so that the pressure plate assists in creating a braking force. The width of the pressure plate may be about 2 mm or more, about 3 mm or more, about 4 mm or more, or about 5 mm or more. The width of the pressure plate may be about 10 mm or less, about 8 mm or less, or about 7 mm or less. The one or more pressure plates may include one or more features and/or recesses so that one or more discrete components may be fixedly attached to the one or more pressure plates via the one or more features and/or one or more recesses. The one or more features and/or one or more recesses may be sufficiently deep so that a connector body when extended into the features and/or recesses is sufficiently flush so that accidental contact with the connector body is reduced and/or substantially eliminated. The brake pads may include one or more shims. During a brake apply the friction material may contact the rotor so that rotation of the rotor is slowed and/or stopped. Repeated contact between the friction material and the rotor results in a reduced thickness of the friction material. The thickness of the friction material when new may be about 4 mm of more, preferably about 5 mm or more, or more preferably about 7 mm or more. The thickness of the friction material, when new, may be about 15 mm or less, about 12 mm or less, or about 10 mm or less. The friction material may be considered a worn when the friction material is below about 3 mm, about 2.5 mm or less, about 2.0 mm or less, or about 1.5 mm or less. The friction material may directly connect to the pressure plate. The friction material may connect to the pressure plate via an under layer. The under layer may have a thickness of about 0.2 mm or more, about 0.5 mm or more, or about 1.0 mm or more. The thickness of the underlayer may be about 2 mm or less, about 1.5 mm or less, or about 1.2 mm or less. The thickness of the friction material discussed herein includes the thickness of the underlayer. A wear indicator may be used to actively monitor and/or passively monitor the thickness of the friction material so that a user is warned when the friction material becomes reduced to a predetermined thickness.

The wear indicator may be any wear indicator that connects to a pressure plate of a brake pad. The wear indicator may have any configuration so that the wear indicator when contacting an opposing part (e.g., a rotor) creates a noise. The wear indicator may be attached to the pressure plate so that a largest dimension extends along the direction of rotation of the rotor. For example, the largest dimension of the wear indicator extends substantially parallel to a face of the rotor. The wear indicator may be used in conjunction with an electronic signal system. Preferably, the wear indicator is free of an electronic signaling system. The wear indicator may be made of any material that makes a noise when rubbed against another material that is made of the same or a different substance.

The material of the wear indicator may be any material that may be shaped and formed. The material may be any material that may exhibit some abrasive resistance, wear resistance, or both. The wear indicator may be made of plastic, metal, a ceramic, a polymer, a natural material, a synthetic material, or a combination thereof. Preferably, the wear indicator is made of stainless steel. The material may have a thickness. The thickness of the material may be about 0.2 mm or more, about 0.3 mm or more, or about 0.5 mm or more. The thickness of the material may be about 3 mm or less, about 2 mm or less, or about 1 mm or less. The thickness of the material may be any thickness so that the wear indicator may be shaped to mirror the shape of a pressure plate, create a noise, or both.

The wear indicator may have any configuration so that substantially all of the wear indicator extends over a pressure, plate of a brake pad. The wear indicator may fee free of or substantially free of a portion that extends off of the pressure plate on a side of the pressure plate opposite the friction material. For example, a portion of the wear indicator may extend over the pressure plate on a side of the pressure plate opposite the friction material, but the wear indicator on the side proximate to the friction material may step at the edge of the pressure plate. A majority of the wear indicator may extend in a longitudinal direction. The wear indicator may have a width and the width may be less than the length of the wear indicator. The width of the wear indicator may be about 2 mm or more, about 3 mm or more, about 4 mm or more, or about 5 mm or more. The width of the wear indicator may be about 10 mm or less, about 8 mm or less, or about 7 mm or less. Preferably, the width of the wear indicator is substantially equal to the width of the pressure plate as discussed herein. The shape of the wear indicator may be substantially in a longitudinal direction.

The wear indicator may have an overall length in the longitudinal direction of about 10 mm or more, preferably about 15 mm or more, more preferably about 20 mm or more, or about 25 mm or more. The wear indicator may have an overall length in the longitudinal direction of about 50 mm or less, about 40 mm or less, or about 30 mm or less. The wear indicator may be contoured. The wear indicator may be contoured so that the wear indicator has a complementary shape to a shape of the pressure plate. The shape of the wear indicator may substantially mirror the shape of the pressure plate. The shape of the wear indicator may curve and/of bend so that the width of the wear indicator may be limited substantially to the width of the pressure plate. The wear indicator may include one or more bends so that the wear indicator complements the shape of the pressure plate.

The bend may be any angle that assists the wear indicator in mirroring the shape of the pressure plate. The bends may each be about 15 degrees or more, about 23 degrees or more, or about 35 degrees or more. The bends may each be about 140 degrees or less, about 125 degrees or less, about 105 degrees or less, or about 90 degrees or less. Preferably, the sum of all of the bends may be about 205 degrees or less, preferably about 180 degrees or less, more preferably about 160 degrees or less, or even more preferably about 150 degrees or less. The sum of ail of the bends may foe about 30 degrees or more, about 45 degrees or more, or about 60 degrees or more. The wear indicator may include a connector, an indicator, and a scraper.

The connector may be any-part of the wear indicator that connects the wear indicator to a pressure plate of a brake pad. The connector may be any shape and size so that the connector has sufficient strength to connect the wear indicator to a pressure plate; to hold the wear indicator on the pressure plate during a brake apply, during installation, or both; to withstand a radial force; a tangential force, or both relative to ah axis of rotation of a rotor; or a combination thereof. The connector may include one or more connector plates and one or more connector bodies.

The one or more connector bodies may be any part of the connector that is located proximate to a pressure plate, which is centrally located so that one or more connector plates extend from the connector body, are connected to an indicator, are connected to a scraper, or a combination thereof. Preferably, the connector body includes at least one connector plate that extends from the connector body. The connector body may be of any size and shape so that the connector body extends over a side and/or an edge of the pressure plate so that a connector plate may foe located on each side of the pressure plate. Preferably the connection body is sized so that the connection body fits within the feature and/or the recess in the pressure plate so that the connection body when connected is not substantially wider than the width of the pressure plate. The connector body may have a size that is substantially similar to the thickness of the feature and/or pressure plate. The connector body may be wider than the feature and/or recess in the pressure plate, wide than feature and/or recess in the pressure plate, or a combination of both. The connector body preferably is sufficiently wide so that the connector body extends from a forward edge of a pressure plate to a rearward edge of a pressure plate. More preferably, the connector body may extend from a first side of the pressure plate to a second side of the pressure plate so that a connector plate extends or connects along each side of the pressure plate to the connector body. The one or more connector bodies may be directly attached to the pressure plate. The one or more connector bodies may be fastened directly to the pressure plate via one or more fasteners. The one or more fasteners may be a screw, a rivet, a pin, peened on via a button, protrusion stamped in the pressure plate, or a combination thereof. The connector body may be free of one or both connector plates.

The one or more connector plates may be any shape and size so that the one or more pressure plates in conjunction with the connector body assist in retaining the wear indicator on the pressure plate. The connector plates may be shaped so that the connector plates substantially mirror one or more features and/or one or more recesses in a pressure plate. The one or more connector plates may have a complementary shape to the one or more features and/or one or more recesses so that the one or more features and/or one or more recesses assist in maintaining the wear indicator on the pressure plate. Preferably, a connector plate extends en each side of the connector body so that a connector plate extends along each side of the pressure plate forming a connection with the pressure plate. The connection plates may be the same size and shape. Preferably, the connection plates are different sizes. One connection plate may be planar and one connection plate may be contoured. The contoured connection plate may be contoured so that the connection plate grips the pressure plate. The connector plates may include a retention feature (e.g., a biasing member, a lip, or both) so that the pressure plates assist in creating a force on the pressure plate to assist, in maintaining the wear indicator on the pressure plate. The retention feature may project from the connection plate. The retention feature may foe a lip that extends from the connection plate so that the lip hooks into the recess and/or feature of the pressure plate and resists the wear indicator from being removed. The connector plates are free of a retention feature and/or a biasing member that assists in retaining the wear indicator on the pressure plate. The connector plates may be free of active retention features. The one or more connector plates may be fastened to directly to the pressure plates. The fastener may be any fastener that forms a secured connection with pressure plate. The fastener may be removable, may be permanent, or both. The fastener may be a screw, a rivet, a pin, peened on via button, protrusion stamped in the pressure plate, or a combination thereof.

The connector plates may be made of any material that maintains its shape and configuration once positioned. The material of the connector plates may be plastically deformable so that the connector plate once bent into contact with a pressure plate maintains its position relative to the pressure plate. The connector plates may be made of plastic, metal, a polymer, a natural material, a synthetic material, or a combination thereof. Preferably, the connector plates are made of stainless steel. The connector plates and connector body may connect a scraper to the brake pad.

The scraper may be any portion of the wear indicator that contacts the rotor. The scraper may be the only portion of the wear indicator that extends beyond an edge and/or side of the pressure plate and/or over the friction material. For example, a portion of the scraper may extend over the friction material so that when the friction material is reduced to a predetermined point the scraper contacts an adjacent surface such as a rotor. The width of the scraper may be about 5 mm or more, about 5.5 mm or more, about 6 mm or more, about 6.5 mm or more, or about 7 mm or more. The width of the scraper may be about 10 mm or less, about 9 mm or less, or about 7 mm or less. The width of the pressure plate as discussed herein may be about $W_P$. The width of the scraper body and the scraper indicator may be about $W_P+0.5$ mm or more, about $W_P+1.0$ mm or more, about $W_P+1.2$ mm or more, about $W_P+1.5$ mm or more, or even about $W_P+2.0$ mm or more. The width of the scraper may be about $W_P+4$ mm or less, about $W_P+3$ mm or less, or about $W_P+2.5$ mm or less.

The scraper may bias during scraping. For example, the scraper may elastically deform during a brake apply so that the scraper produces pressure against an opposing surface (i.e., a rotor) so that the scraper produces vibration and/or noise that is transmitted throughout the wear indicator. Preferably, the scraper is free of a configuration where the scraper biases. For example, the scraper when in contact with an opposing surface may be substantially free of movement. The only movement of the scraper may be elastic deformation due to a material characteristic and/or vibration caused by contact with the opposing surface. The scraper may be free of plastic deformation, elastic deformation, or both during contact with an opposing surface. More preferably, the scraper is free of any bends, turns, angled portion, biasing member, or a combination thereof that assist is producing a force toward the opposing surface so that during a brake apply the scraper produces a force against the opposing surface.

The scraper may contact the pressure plate, the friction material, or both during a running condition, a brake on condition, or a condition therebetween. Preferably, the scraper is free, of contact with the pressure plate, the friction material, or both during a brake on condition, a running condition, or a condition therebetween. The scraper may be separated from the pressure plate, the friction material, or both by a gap. The gap may be any size so that the scraper contacts an opposing surface and produces an audible indication. The gap may be greater than about 0 mm, about 0.1 mm or more, about 0.5 mm or more, or about 1.0 mm or more.

The gap may be about 2.0 mm or less, about 1.5 mm or less, or about 1.2 mm or less. The size of the gap may be greater than about 0 mm to about 1.5 mm, preferably from about 0.1 mm and about 1.2 mm, and more preferably between about 0.2 mm and about 1.0 mm. The scraper may form a cantilever connection with the connector so that the gap is formed between the pressure plate and the scraper. The scraper may have a scraper body and a scraper indicator.

The scraper indicator may be any part that extends over the friction material and contacts an adjacent surface. The scraper indicator may entirely reside over the friction material when a brake pad is new. The scraper indicator may partially extend beyond the friction material when a brake pad is in a fully worn condition. The scraper indicator may have any shape so that when the scraper indicator contacts an adjacent surface the scraper indicator assists in creating an audible indication. The width of the wear indicator, the scraper body, or both as discussed herein may be Y. The largest width of the wear indicator may be where the scraper includes the scraper indicator. The width of the wear indicator other than the scraper may be substantially equal to the width of a pressure plate. The width of the scraper and scraper indicator may be sufficiently wide to indicate when a predetermined amount of friction material have been removed (i.e., a worn condition). The width of the scraper and the scraper indicator may be about Y+0.5 mm or more, about Y+1.0 mm or more, about Y+1.2 mm or more, about Y+1.5 mm or more, or even about Y+2 mm or more. Thus, for example, the scraper body may have a width Y (i.e., be equal to the rest of the wear indicator) that is substantially equal to the width of the pressure plate and the scraper indicator may extend beyond the pressure plate the distance recited in addition to Y (i.e., about 0.5 mm or more, about 1.0 mm or more, about 1.2 mm or more etc. . . . ) The width of the scraper may be about Y+4 mm or less, about Y+mm or less, or about Y+2.5 mm or less.

The scraper indicator may extend along a plane and a contact portion of the scraper may extend within the plane. For example, the contact portion may be the largest dimension of the scraper. The contact portion may be a portion of the scraper that extends substantially parallel to the pressure plate. The contact portion of the scraper indicator may be positioned so that the contact portion is tangential to the circumference of the rotor. Preferably, the contact portion is positioned so that the contact portion is angled to form substantially a right angle with the direction of rotation of the rotor. For example, the contact portion of the scraper is angled so that a direction of rotation of the rotor is substantially perpendicular to the contact portion. The contact portion may be positioned so that the contact portion extends along a radial length between the center of the rotor and an edge of the rotor (i.e., a radius). In another example, the contact portion of the scraper may be aligned substantially radially with the rotor such that the direction of rotor rotation is substantially perpendicular to the scraper. The scraper may be aligned substantially radially so that the scraper may lie slightly at an angle relative to a line that extends radially from the center of the rotor. The scraper may be aligned at an angle of about ±1.0 degree or more, about ±3.0 degrees or more, or about ±5.0 degrees or more from a line that extends radially from the center of the rotor. The scraper may be aligned at an angle of about ±10 degrees or less, about ±8.0 degrees or less, or about ±7.0 degrees or more from a line that extends radially from the center of the rotor.

The scraper may have a smooth surface, a grooved surface, a rough surface, indentations, or a combination thereof. Preferably, the scraper includes one or more features that assist in creating an audible indication. More preferably, the scraper includes one or more grooves in the scraping portion that assist in producing an audible indication. The one or more grooves may be an absence of material at a point along the scraping surface. The scraper when in contact with an adjacent surface may transfer vibration, noise, or both from the scraper into the scraper body.

The scraper body may provide a cantilever connection for the scraper so that the scraper extends over the friction material. The scraper body may reside substantially entirely over the pressure plate. The scraper body may be substantially the same width as the pressure plate. The scraper body may be located between the connector and the indicator portion. The scraper body may form an angled connection with the connector, the indicator portion, or both. The scraper body and the connection, the scraper body and the indicator portion, or both may form any angle discussed herein for the one or more bends. The scraper body may connect to the indicator portion so that the vibration, noise, or both of the scraper indicator is transferred to the indicator portion.

The indicator portion may form a cantilever connection with the scraper. The indicator portion and the scraper may extend substantially within the same plane. The indicator portion and the scraper may form an angle. The indicator portion and the scraper may form an angle of more than about 0 degrees, about 25 degrees or more, about 50 degrees or more, preferably about 75 degrees or more, more preferably about 105 degrees or more, or even more preferably about 125 degrees or more (i.e., about 139 degrees). The indicator portion and the scraper may form an angle of about 200 degrees or less, preferably about 180 degrees or less, more preferably about 180 degrees or less, or even more preferably about 145 degrees or less. Preferably the indicator portion and the scraper portion are not coplanar. The indicator portion may extend, from the scraper at an angle so that the indicator portion follows the contours of the pressure plate.

The indicator portion may contact the pressure plate, the friction material, or both during a running condition, a brake on condition, or a condition therebetween. Preferably, the indicator portion is free of contact with the pressure plate, the friction material, or both during a brake on condition, a running condition, or a condition therebetween. More preferably, the indicator portion may be free of contact with any other component except for the cantilever connection, with the scraper. The indicator portion and the pressure plate, the friction material, or both may be separated by a gap. The gap may be any size so that when the scraper contacts an opposing surface the indicator portion assists in producing an audible indication. The gap may be greater than about 0 mm, about 0.1 mm or more, about 0.5 mm or more, or about 1.0 mm or more. The gap may be about 5.0 mm or less, about 3 mm or less, or about 2 mm or less. The gap may be of a sufficient size so that, the indicator may move up and down, side to side, diagonally, in a circular fashion, or a combination thereof so that an indication is produced. The gap may vary along the length of the wear indicator and/or the indicator portion. The indicator portion may be substantially planar so that the gap between the pressure plate and the indicator portion is substantially the same along the length of the indicator portion.

The indicator portion may be substantially free of any bends, curves, angled portions, arcuate portions, or a combination thereof. The indicator portion may be free of any bends having an angle of about 45 degrees or more, preferably about 30 degrees or more, more preferably about 15 degrees or more, or more preferably about 5 degrees or more. The indicator portion may include a contour (i.e., the indicator portion may not be planar). The indicator portion may include one or more bends so that the indicator portion follows a contour of a pressure plate, the frequency of the indicator is changed, the noise of the indicator is changed, or a combination thereof. The indicator portion may include an indicator body and one or more indicator ends.

The indicator body may be any part of the indicator portion that connects to the scraper body. The indicator body may have any size and shape so that the indicator body assists in producing an audible indication, connecting the indicator ends to the pressure plate, or both. The indicator portion may be any size and shape so that the indicator body extends over the pressure plate. The indicator portion may extend within only the plane of the pressure plate. The indicator portion may extend substantially parallel to the plane of the friction material. The indicator portion may be any size and shape so that the indicator body is free of extension beyond the edges of the pressure plate. The indicator portion may extend beyond an edge of the pressure plate on the edge opposite the friction material. The indicator portion may have an hour glass shape. The indicator portion may form a thin neck region. The indicator portion may include lateral indentations that form the thin neck portion. The indicator portion may form a narrow arm that extends between, connects, transfers vibration and/or noise, or a combination thereof from the scraper body to the indicator ends.

The one or more indicator ends may be any part of the wear indicator that assists in producing an audible indication. The one or more indicator ends may include a fixed end and a free end. The fixed end may be connected to the indicator body and the free ends may extend cantilever over the pressure plate so that the free ends are free to move during an indication. The free ends during an indication may move: up, down, side to side, diagonally, in a circular fashion, or a combination thereof so that the one or more indicator ends assist in producing an audible indication. The one or more indicator ends may extend from the scraper so that the free ends extend from the scraper in an opposite direction of the direction of rotation of the rotor (i.e., towards the leading end). Preferably, the one or more, indicator ends may extend from the scraper so that the free ends extend from the scraper in the direction of rotation of the rotor (i.e., towards the trailing end).

There may fee one or more indicator ends. Preferably, there may be at least two indicator ends. The at least two indicator ends may be substantially discrete from one another, other than a connection to the indicator body. The one or more indicator ends may be in any configuration so that the one or more indicator ends assist in producing an audible indication when the wear indicator contacts an adjacent surface. However, the indicator ends may include one or more bends, waves, curves, the like, or a combination thereof so that the one or more indicator ends extend out of a single plane. Preferably, the one or more indicator ends may be substantially planar. For example, the indicator ends may extend substantially in a single plane. When more than one indicator ends are present the indicator ends may have any configuration relative to each other so that: the indicator ends produce an audible indication, ail of the indicator ends are contained, within the dimensions (e.g., width, length, or area) of the pressure plate, all of the indicator ends converge and attach to the indicator body, or a combination thereof. The two or more indicator ends may be parallel, angled away from each other, angled towards each other, partially angled towards each other and partially parallel, of a combination thereof. Preferably, the indicator ends may be tuning fork shaped. The indicator ends may be the largest portion of the wear indicator.

The wear indicator as discussed herein may have a length X. The length of the indicator ends may be about 0.3 X or more, about 0.4 X or more, or about 0.5 X or more. The length of the indicate ends may be about 0.8 X or less, about 0.7 X or less, or about 0.65 X or less. The length of the one or more indicator ends may be about 5 mm or more, preferably about 7 mm or more, more preferably about 8 mm or more, or even more preferably about 10 mm or more. The length of the one or more indicator ends may be about 25 mm or less, about 20 mm or less, or about 15 mm or less (i.e., from about 10 mm to about 12 mm).

The wear indicator may make an audible indication with sufficient decibels so that a vehicle occupant can hear the audible indication from inside of the vehicle. The wear indicator may an audible indication with sufficient decibels so that a vehicle occupant can hear the audible indication when a radio in the vehicle is off, on, or both. The wear indicator may make an audible indication of about 40 decibels or more, about 50 decibels or more, about 60 decibels or more, about 70 decibels or more, or about 80 decibels or more. The wear indicator may make an audible indication of about 120 decibels or less, about 100 decibels or less, or about 90 decibels or less.

The audible indication (e.g., frequency, volume, noise, or a combination thereof) of the wear indicator may be tuned. The audible indication may be tuned by adjusting one or more features of the wear indicator. The audible, indication may be tuned by adjusting one or more of the following: length, width, material thickness, the number of indicator ends, the shape of the indicator body, the shape of the scraper indicator, the angle of the scraper relative to the rotor, the gap else, the angle between the indicator portion and the scraper, or a combination thereof.

Figure 1:
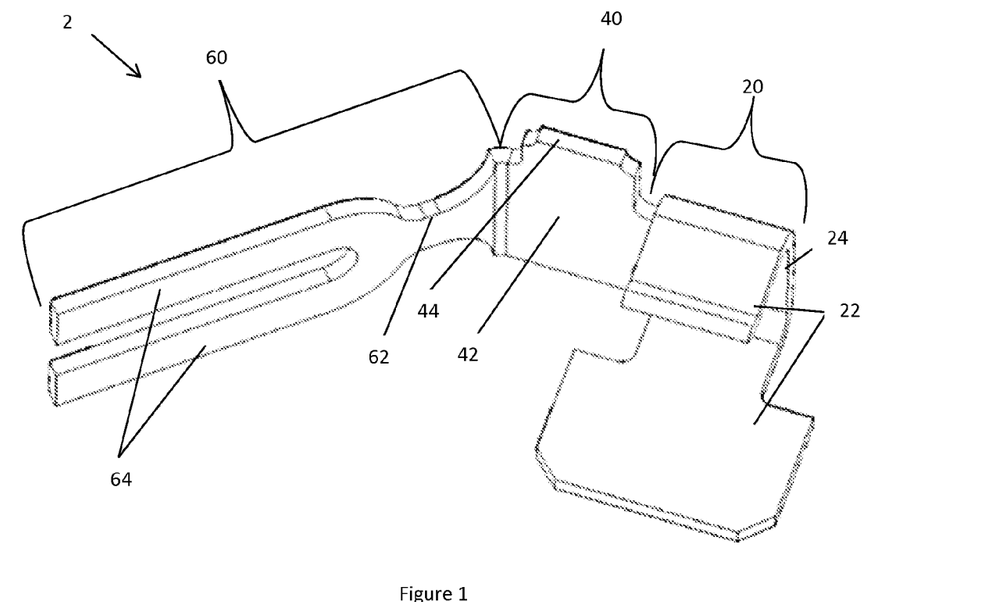
FIG. 1 illustrates a perspective view of a wear indicator.

FIG. 1 illustrates a perspective view of one example of a wear indicator 2. The wear indicator 2 includes a connector 20. The connector 20 has a connection body 24 with a connection plate 22 on each side of the connection body 24. The connection plates 22 as illustrated are different sizes. A scraper 40 is attached to a connector 20. The scraper 40 includes a scraper body 42 and a scraper indicator 44. The scraper 40 is connected to an indicator portion 60 so that the indicator portion 80 extends from the scraper 40. The indicator portion 60 has an indicator body 62 and two indicator ends 64. The scraper 40 and the indicator portion 60 form a cantilever connection with the connector 20.

Figure 2:
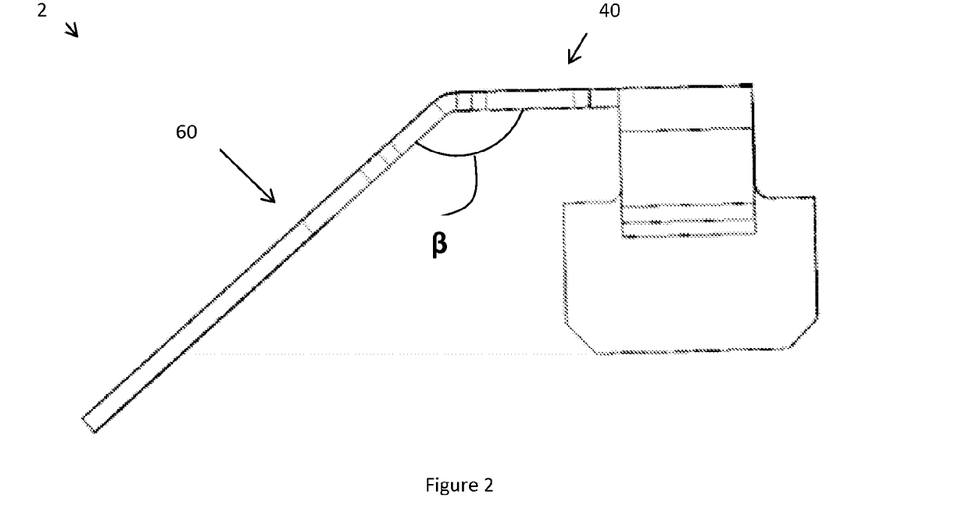
FIG. 2 illustrates a side view of the wear indicator of FIG. 1.

FIG. 2 illustrates a side view of the wear indicator 2. An angle (β) is formed between scraper 40 and the indicator portion 60.

Figure 3A:
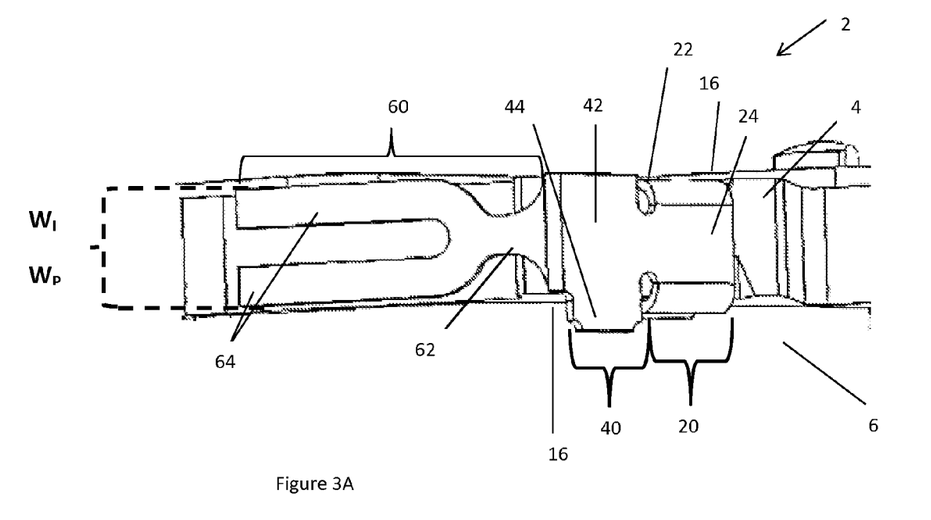
FIG. 3A illustrates an example of a wear indicator connected to a pressure plate.

FIG. 3A illustrates a wear indicator 2. The wear indicator 2 includes a connector 20 a scraper 40 and an indicator 60. The connector 20 includes at least two connection plates 22 attached on opposing sides of connection body 24. The connection plates 22 extend around both sides of a pressure plate 4 and into a recess and/or feature 18 (not shown) in the pressure plate 4 so that the wear indicator 2 is attached to the pressure plate 4. The connection body 24 is connected, to the scraper 40. The scraper 40 and indicator portion 60 and forms a cantilever connection with the connector 20 so that a gap is formed under the scraper 40 and the indicator portion 80. The scraper 40 includes a scraper body 42 and scraper indicator 44. The scraper indicator 44 extends beyond an edge 18 of the pressure plate 4 so that the scraper indicator 44 contacts a component (not shown) when a sufficient amount of friction material 8 is removed so that the scraper indicator 44 extends beyond the width ($W_P$) of the friction material 6 (not shown) and contacts an adjacent surface (not shown). An indicator 80 is connected to the scraper body 42 and extends away from the scraper 40 and the connector 20. The indicator 60 includes an indicator body 82. The indicator body 62 branches to form two indicator ends 64. As illustrated the two indicator ends 64 are substantially parallel. The indicator portion 60 as illustrated has a width ($W_I$) that is substantially equal to a width ($W_P$) of the pressure plate so that the indicator portion 60 does not overhang the pressure plate 4 on a side of the pressure plate proximate to the friction material 6.

Figure 3B:
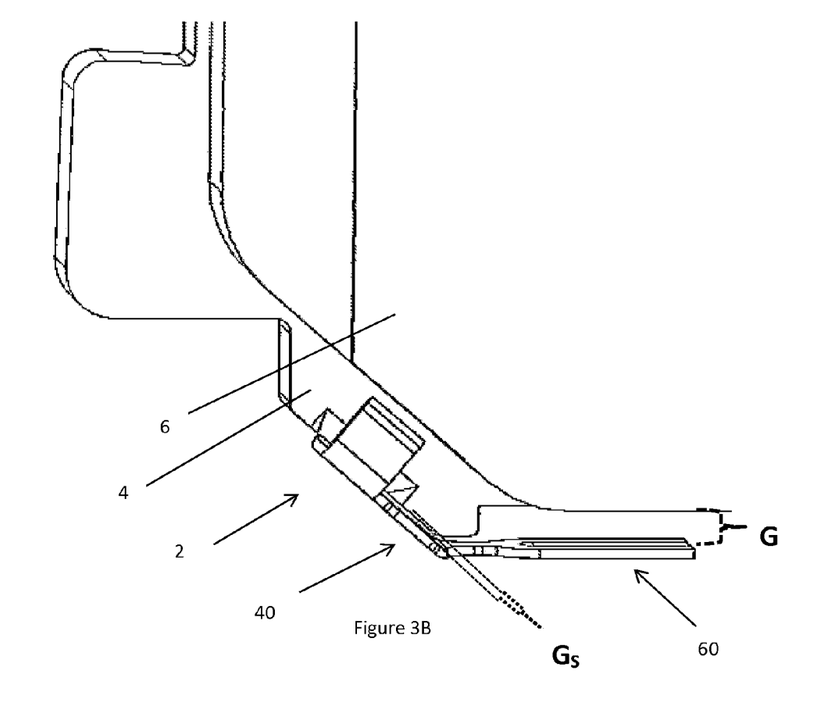
FIG. 3B illustrates a side view of a wear indicator connected to a brake pad.

FIG. 3B illustrates a side view of a wear indicator 2 connected to a pressure plate 4. The wear indicator 2 extends below the friction material 6 so that the indicator 60 forms a gap (G) between the pressure plate 4 and the friction material 6. The scraper 40 also has a gap ($G_S$) between the scraper 40 and the pressure plate 4.

Figure 4A:
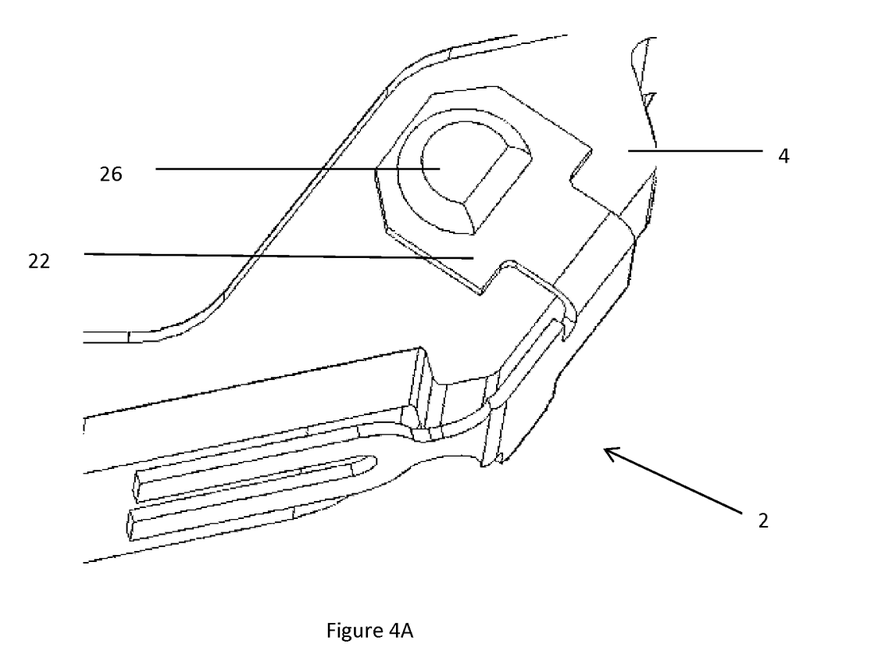
FIGS. 4A and 4B illustrate an example of a wear indicator that has been peened onto the brake pad.
Figure 4B:
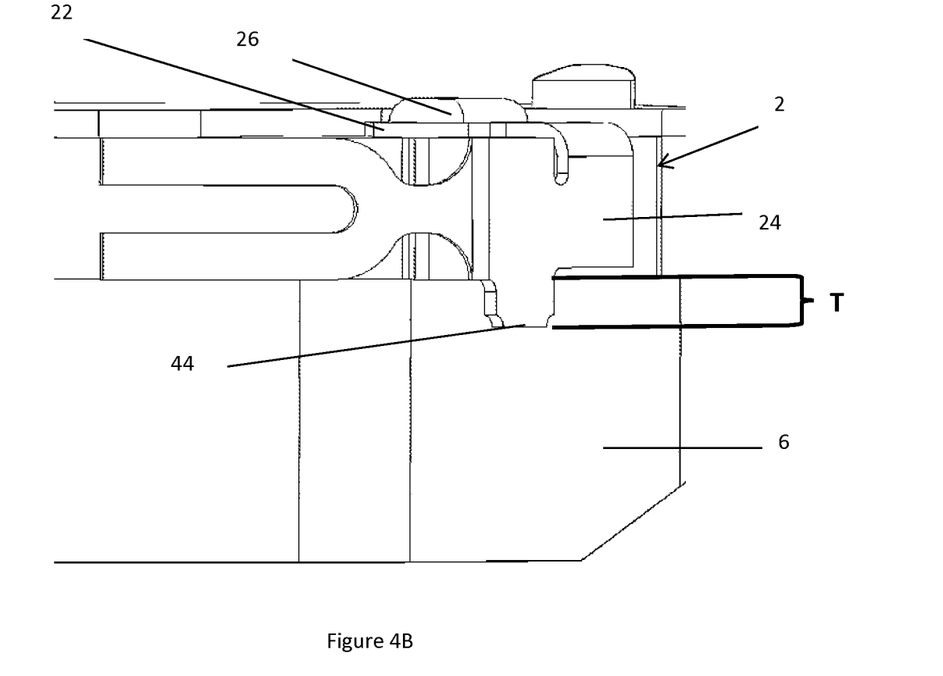

FIGS. 4A and 4B illustrate ah example of peened connection 26. FIG. 4A is a perspective view of wear indicator 2 and the peened connection 26 between a connection plate 22 and the pressure plate 4. FIG. 4B illustrates a bottom view of the peened connection 26. As illustrated, the wear indicator 2 includes only one connection plate 22 and the other side of the connection body 24 is free of a connection plate 22. The scraper indicator 44 extends over the friction material 6 a distance (T).

Figure 5:
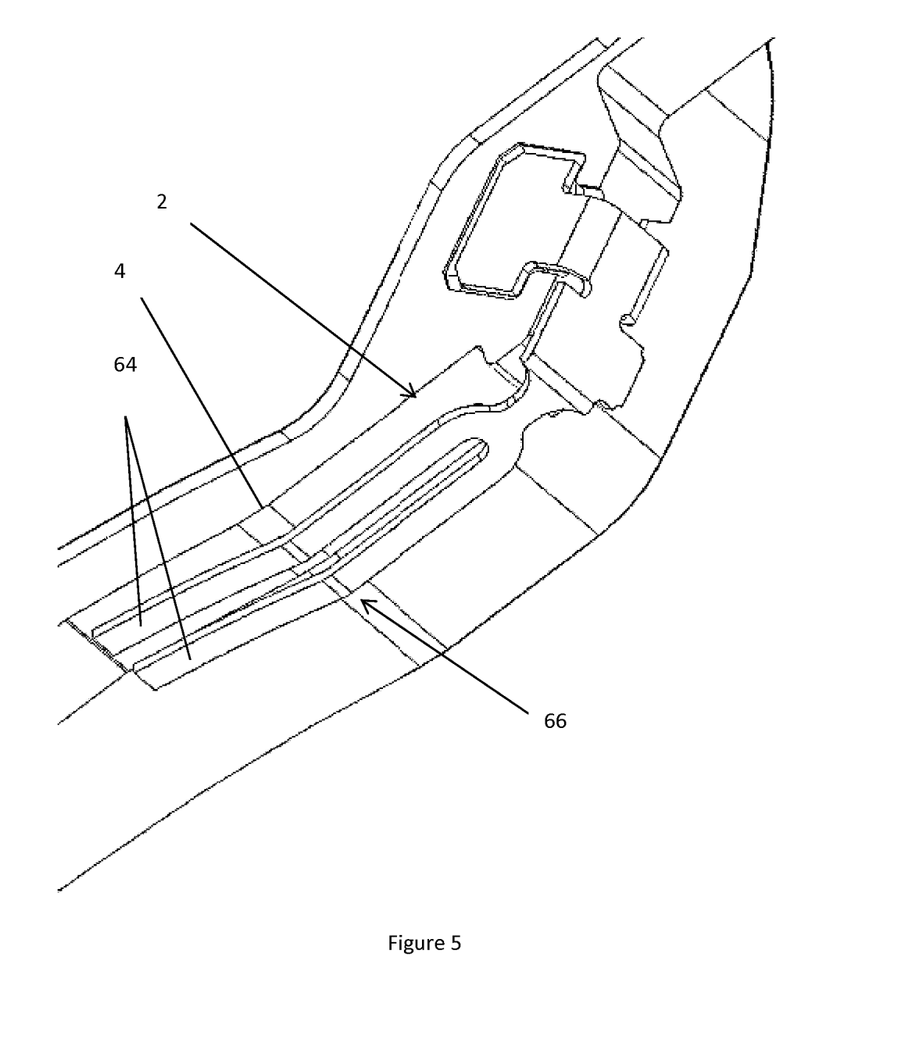
FIG. 5 illustrates an example of a wear indicator with extended indicator ends.

FIG. 5 illustrates an example of a wear indicator 2 including extended indicator ends 64 having bends 66 that mirror the shape of the pressure plate 4.

Figure 6A:
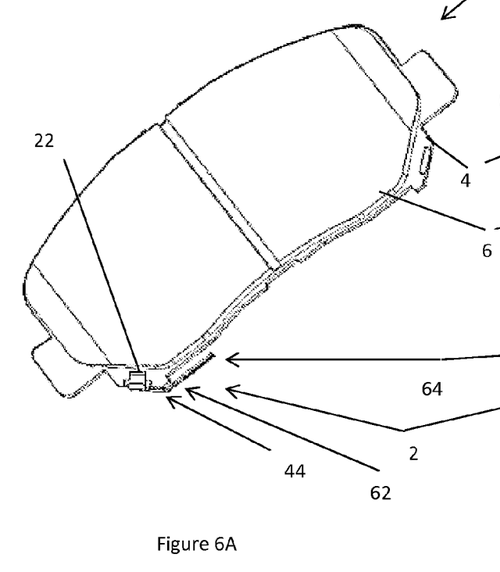
FIGS. 6A and 6B illustrate a front and rear view of a brake pad including the wear indicator.
Figure 6B:
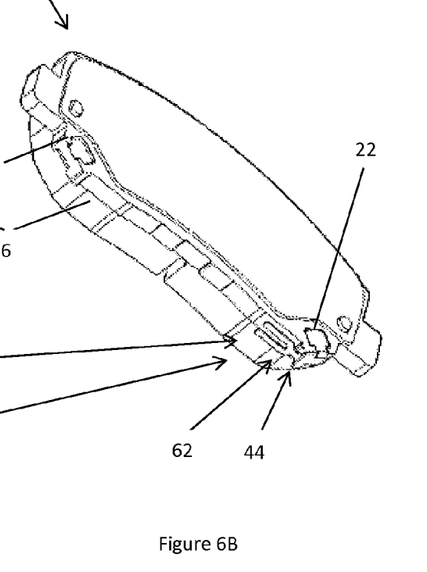

FIGS. 6A and 6B illustrate the wear indicator 2 connected to a brake pad 8. FIG. 4A illustrates the front side of the brake pad the wear indicator 2 includes a connection plate 22 extending on the front side of the pressure plate 4 to assist in connecting the wear indicator 2 to the brake pad 8. The scraper indicator 44 extends beyond the pressure plate 4 so that a portion of the scraper indicator extends over the friction material 6. FIG. 4B illustrates the rear side of the brake pad 8. The wear indicator 2 includes a connection plate 22 extending on the rear side of the pressure plate 4 to assist in connecting the wear indicator 2 to the brake pad 8. As illustrated in both FIGS. 4A and 4B the indicator body 62 and indicator ends 64 extend substantially parallel to the pressure plate 4 of the brake pad 8.

Figure 7:
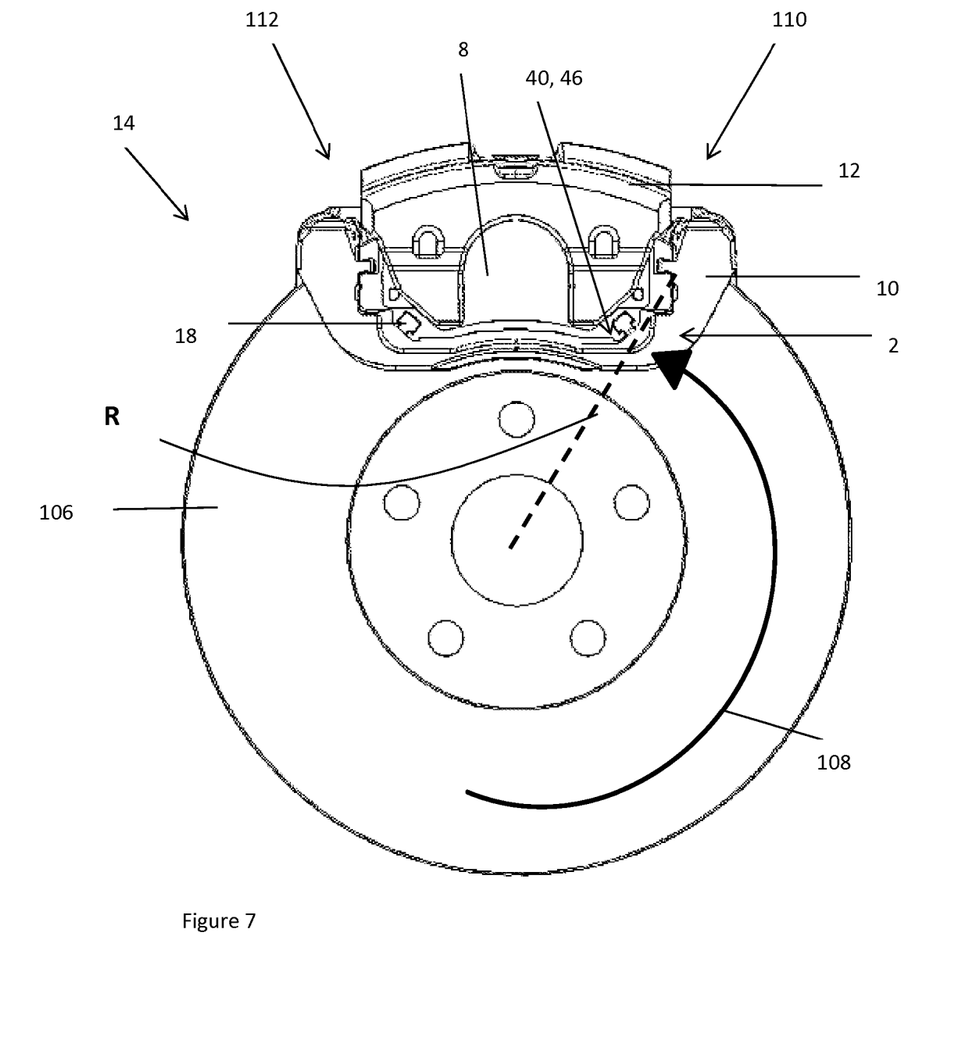
FIG. 7 illustrates a brake system including a brake pads having the wear indicator.

FIG. 1 illustrates a brake system 14. The brake system 14 includes a support bracket 10, a caliper 12, and a rotor 106. The brake pad 8 is installed in the support bracket 10 and the caliper 12 extends over the brake pad 8. The brake pad 8 includes a wear indicator 2. The brake pad 8 includes a recess or feature 18 for assisting in connecting the wear indicator 2 to the brake pads 8. The rotor 108 rotates in the direction of rotation 108 so that the rotor first passes through the brake system 14 on a leading side 110 and exits the brake system 14 on a trailing side 112 of the brake system 14. As illustrated the wear indicator 2 is connected on the leading side 110 of the brake system. However, the wear indicator 2 may be located on the leading side 110, the trailing side 112, or both. The rotor 108 includes a radius (R) that extends from the center of the rotor to an edge of the rotor 108 and the radius (R) and a contact surface 46 of the scraper 40 are substantially parallel.

Figure 8:
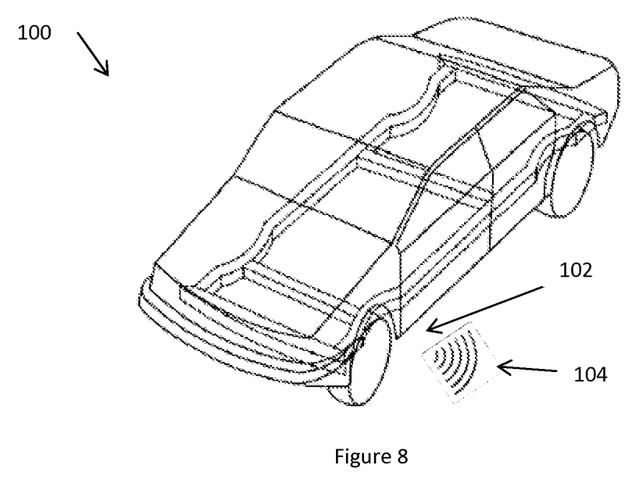
FIG. 8 illustrates a vehicle during a brake apply.

FIG. 8 illustrates a vehicle 100 having a brake system 102. The brake system 102 includes the wear indicators (not shown) of the teachings herein. During a brake apply, as shown, the wear indicator produces an audible indication 104.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component, or step is not intended to foreclose additional elements, ingredients, components or steps.

I claim:

1. A wear indicator comprising:
   a. a connector that attaches the wear indicator to a brake pad, the brake pad including a friction material having a plane;
   b. a scraper configured to contact a rotor in a brake system; and
   c. an indicator portion;
   wherein the indicator portion forms a cantilever connection with the scraper and extends parallel to the plane of the friction material; and
   wherein the indicator portion includes an indicator body and the indicator body is generally hour glass shaped.

2. The wear indicator of claim 1, wherein at least two indicator ends extend from the indicator body.

3. The wear indicator of claim 2, wherein the at least two indicator ends are substantially discrete from each other and extend substantially parallel to each other.

4. The wear indicator of claim 1, wherein the scraper includes a scraper body and a scraper indicator, and the scraper indicator extends over the friction material.

5. The wear indicator of claim 4, wherein the scraper indicator is configured so that the scraper indicator is substantially free of any deformation during contact.

6. The wear indicator of claim 1, wherein the scraper is attached to the connector so that the scraper extends over at least a portion of the brake pad and a gap is formed between at least a portion of the brake pad and the scraper.

7. The wear indicator of claim 1, wherein the connector includes a connection body and a connection plate on each side of the connection body that attach the wear indicator to the brake pad.

8. A wear indicator comprising:
   a. a connector that attaches the wear indicator to a brake pad, the brake pad including a friction material having a plane;
   b. a scraper configured to contract a rotor in a brake system; and
   c. an indicator portion;
   wherein the indicator portion forms a cantilever connection with the scraper and extends parallel to the plane of the friction material; and
   wherein the indicator portion includes an indicator body and an indicator end having a tuning fork shape that extends from the indicator body.

9. A wear indicator comprising:
 a. a connector that attaches the wear indicator to a pressure plate of a brake member;
 b. a scraper configured to contact a rotor in a brake system that extends from the pressure plate of the brake member over a friction material so that when a predetermined amount of the friction material is removed the scraper assists in creating an indication; and
 c. an indicator portion that works in conjunction with the scraper to create the indication;
  wherein the scraper is located between the connector and the indicator portion; and
  wherein the indicator portion is generally planar and is free of any bends having an angle of 45 degrees or more.

10. The wear indicator of claim 9, wherein the indicator portion and the scraper form an angle of less than about 30 degrees.

11. The wear indicator of claim 9, wherein the indicator portion is substantially aligned with the pressure plate of the brake member.

12. The wear indicator of claim 9, wherein the indicator portion is at least 8 mm in length and has a fixed end that is connected to the scraper and a free end that extends over the pressure plate of the brake member so that the indicator portion is free to move to create the indication.

13. The wear indicator of claim 9, wherein the indicator portion includes an indicator body that has a narrow neck region.

14. A brake system comprising:
 a. a rotor having a pair of opposing faces defining a plane;
 b. one or more brake members comprising:
  i. a pressure plate and
  ii. a friction material having a plane that extends along a longitudinal axis; wherein one of the one or more brake members extends on each side of the rotor;
 c. one or more wear indicators comprising:
  i. a connector for attaching the one or more wear indicators to the pressure plate of the one or more brake members;
  ii. a scraper configured to contact the rotor that extends over the friction material so that when an amount of friction material is removed the scraper extends beyond the friction material creating a sound; and
  iii. an indicator portion that extends along the pressure plate;
 wherein the indicator portion forms a cantilever connection with the scraper and extends parallel to the plane of the friction material; and
 wherein the shape of the wear indicator substantially follows one or more contours of the pressure plate; and
 wherein the indicator portion includes an indicator body attached to and extending from the scraper and the indicator body extends from the scraper in a direction of rotation of the rotor.

15. The brake system of claim 14, wherein the indicator portion is entirely located within an area determined by the size of the pressure plate.

16. The brake system of claim 14, wherein the indicator portion does not extend beyond a width of the pressure plate on a side of the brake member proximate to the friction material.

17. The brake system of claim 14, wherein the indicator portion is free of extension over a side of the pressure plate proximate to the friction material and over a side of the pressure plate opposite the friction material.

18. The brake system of claim 14, wherein the indicator portion includes indicator ends extending from the indicator body, and the indicator and form a cantilever connection with the indicator body so that the indicator ends extend over the pressure plate without contacting the pressure plate.

* * * * *